April 22, 1958  G. E. LEADBETTER  2,831,711

WEDGE RING DETENT PIPE COUPLING

Filed Oct. 30, 1952

INVENTOR.
GILBERT E. LEADBETTER
BY
Oberlin & Limbach
ATTORNEYS.

United States Patent Office 2,831,711
Patented Apr. 22, 1958

2,831,711

WEDGE RING DETENT PIPE COUPLING

Gilbert E. Leadbetter, Mansfield, Ohio

Application October 30, 1952, Serial No. 317,759

2 Claims. (Cl. 285—238)

The present improvements relating as indicated to threadless pipe connectors, have more particular regard to connectors designed for use with tubing made from relatively soft thermoplastic material which is susceptible to cold flow or deformation under the influence of a sustained force. It is well-known that tubing of this nature, such for example as polyethylene tubing, cannot effectively be joined by conventional threaded connectors, and it has been necessary to devise special fittings and connectors usable therewith. Such fittings have in the past generally included a sleeve, which may be serrated or notched about its outer surface, adapted to fit within the end of the tubing to be connected and an external clamping ring disposed to tightly engage and hold the tubing on the sleeve. The sleeve, of course, presents an internal obstruction tending to disrupt the uniform flow of gas or liquid through the joint and, moreover, the tubing material will gradually flow from under the clamping ring, thus necessitating periodic inspection and re-tightening of the ring.

The object of the present invention is to provide simple mechanical connecting means which will insure against longitudinal displacement of the end of the pipe from the coupling or other fitting through external engagement only with the pipe.

To the accomplishment of the foregoing and related ends, said invention, then, consists of the means hereinafter fully described and particularly pointed out in the claims.

The annexed drawing and the following description set forth in detail certain mechanism embodying the invention, such disclosed means constituting, however, but one of various mechanical forms in which the principle of the invention may be used.

Figure 1:
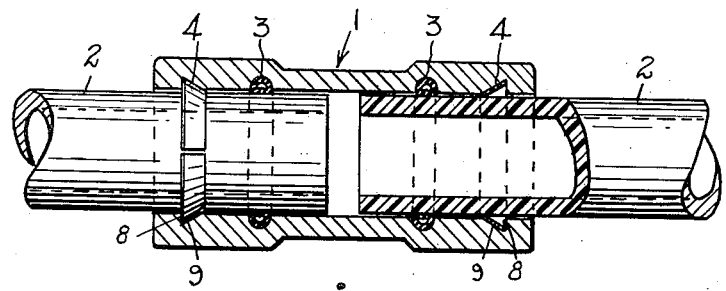
Fig. 1 is a longitudinal section of one form of the invention showing the manner in which the pipe is received in the connector.

Referring in detail to the drawing, the body of the connector shown in Fig. 1 is in the form of a sleeve 1 which may be made of plastic or of metal suitably coated to inhibit corrosion. The sleeve is designed to fit over and embrace the respective ends of the plastic pipe to be connected and, preferably, is provided with sealing means to prevent escape of gas or liquid flowing through the joint.

The fluid seal may be effected by means of the sealing rings 3, one of which is located in each end portion of the sleeve for operative engagement with the pipe length 2 inserted therein. These rings are formed from a resilient material, which is preferably chemically inert with respect to the gas or liquid conveyed, and may be hollow as shown. Each sealing ring 3 is seated in an annular groove in the inner surface of the sleeve 1 and is of such size as to project inwardly beyond the inner sleeve surface. Thus, when a pipe length 2 is inserted in one end of the connector, it will engage and distort the sealing ring 3 therein to force such ring into tight contact with both the pipe length and the groove in which the ring is seated. In this manner, the ring is prevented from being displaced by fluid pressure within the connector and at the same time it effectively seals the joint against fluid leakage.

Figure 2:
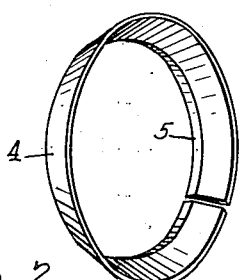
Fig. 2 is a perspective view of one of the split locking rings shown in Fig. 1.
Figure 3:
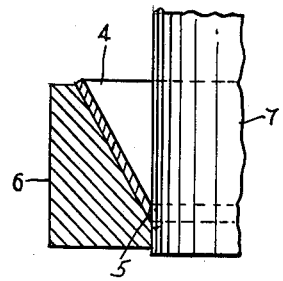
Fig. 3 is a partial vertical section of apparatus which may be used in shaping such ring.

In order to insure against longitudinal displacement of the pipe lengths from the connector, I provide in the structure thus far described positive locking means in each end portion of the sleeve which will permit the ready insertion of the pipe but will operate automatically to prevent its withdrawal. Such means comprises a split metallic ring 4 which, as most clearly shown in Fig. 2, is of generally frusto-conical shape with a knife-edge 5 at its smaller end. This dished ring may be formed from shim stock steel and the knife-edge applied thereto by placing it in a conforming die member 6 through which a punch 7 is movable to cut away the edge of the collar at its smallest internal diameter in well-known manner.

The inner surface of the connector sleeve is provided with a pair of outer annular grooves for removably receiving the dished rings 4 with each such groove forming a radially extending shoulder 8 and an inclined surface 9 extending from the end of the shoulder interiorly of the sleeve to the inner surface thereof. The shape of these grooves thus conforms to the shape of the locking rings, however, the depth of the grooves is such that the rings will be slightly spaced from groove surfaces 9 and will extend beyond the inner surface of the sleeve. The respective knife-edges 5, therefore, will be directed angularly inwardly for engagement with the pipe lengths 2, and since the inclination of the knife-edges is in the direction of pipe insertion, the resiliency of the pipe material will permit the lengths to pass in this direction, but any reverse or withdrawing movement will cause the knife-edges to bite into the pipe about substantially the entire periphery thereof.

Figure 4:
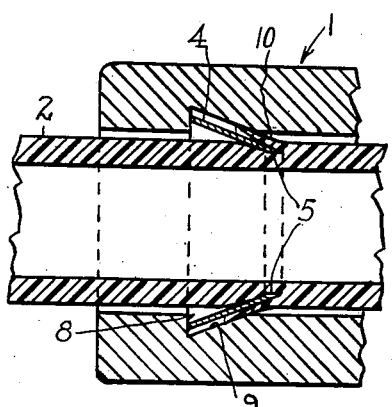
Fig. 4 is a fragmentary section of the connector on an enlarged scale illustrating more clearly the operation of the locking ring.

As the knife-edge 5 of each dished ring bites into the the pipe, it will displace material therefrom in the form of an annular attached shaving, shown at 10 in Fig. 4, which will enter and wedge itself in the space between the ring and the adjacent groove surface 9, thereby to assist the locking action. It will be apparent that this engagement with the pipe together with the abutment of the rings against the sleeve shoulders 8 firmly locks the pipe within the connector.

Figure 5:
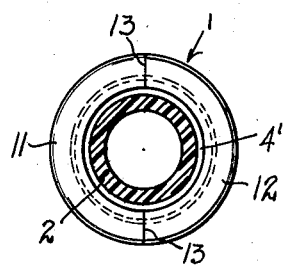
Fig. 5 is an end view of a connector equipped with continuous, rather than split, locking rings.

Although the dished rings 4 are split to permit their insertion in the connector subsequent to formation of the sleeve 1 in any suitable manner, continuous rings of similar design and function may be employed as shown in Fig. 5. In this case, however, the sleeve is formed of separate sections and the rings located therein prior to joining the same. Thus, in Fig. 5 the continuous ring 4' is placed between the sleeve half sections 11 and 12 which are then joined to complete the connector. Such sections are preferably of plastic united along the seams 13 by solvent welding.

From the foregoing, it will be seen that my connecting means is operably complete in itself and, therefore, does not require any special tools or materials for its use. Its application does not involve the exercise of any particular skills, and the elimination of an independently performed locking step greatly reduces the possibilities of faulty connection due to carelessness.

While I have shown and described my invention as applied to a straight sleeve type of connector, it will be obvious that it may be employed to equal advantage in other types of fitting, such as the common T and elbow joints, and that the pipes connected need not be of the same size since correspondingly differently sized locking collars could be used. The present disclosure will suggest other possible modifications to those skilled in the art, such modifications, however, being within the basic idea of the invention.

Other modes of applying the principle of the invention may be employed, change being made as regards the details described, provided the features stated in any of the following claims, or the equivalent of such be employed.

I therefore particularly point out and distinctly claim as my invention:

1. A threadless connector for plastic pipe and the like, comprising a one-piece body having a cylindrical opening for insertion of an end portion of a length of such pipe, the diameter of such opening being slightly greater than the external diameter of the pipe, said body further having an annular groove in its opening-defining surface which encircles that portion of the pipe inserted in the opening, such groove being formed by a substantially radial wall and a contiguous inwardly sloping wall, and a frusto-conical split locking ring serving as the only means joining the connector and the pipe, said ring being abutted at its larger end against the substantially radial wall of the body groove and extending closely along and beyond the other groove wall into the body opening for engagement with the pipe end portion, the inner end of the ring having a diameter which is slightly less than the external pipe diameter but of sufficient size for forced passage therethrough of the pipe end in the direction of insertion, the inner end portion of said ring having an internal surface which is substantially parallel to the connector axis, with its outer surface at an acute angle to such axis, to form a sharp terminal edge operative to bite into the encircled pipe on any attempted withdrawal of the same, such biting action resulting in outward displacement of material from the pipe and wedging thereof between the ring and the sloping groove wall.

2. A threadless connector for plastic pipe and the like, comprising a one-piece body having a bore for insertion in opposition of end portions of two lengths of such pipe to be connected, the bore being of slightly larger diameter than the external diameter of the embraced pipe end portions and formed with annular grooves respectively adjacent its ends, each such groove being defined by a substantially radial wall and a contiguous inwardly sloping wall, and a frusto-conical split locking ring seated in each groove, such rings being abutted at their larger ends against the substantially radial groove walls and extending closely along and beyond the other groove walls into the bore for engagement with the pipe end portions respectively encircled thereby, the inner ends of the rings being of slightly smaller diameter than the external pipe diameter but of sufficient size for forced passage of the pipe ends through the same in their respective directions of insertion, the inner end portions of the rings having interior surfaces which are substantially parallel to the connector axis, with their outer surfaces at an acute angle to such axis, to form sharp terminal edges operative to bite into the encircled pipe ends on any attempted withdrawal of the same, such biting action of the rings causing pipe material to be displaced and wedged between the rings and the sloping groove walls, the two locking rings forming the sole means joining the pipe lengths to the connector.

References Cited in the file of this patent

UNITED STATES PATENTS

| | | |
|---|---|---|
| 2,225,208 | Crickmer | Dec. 17, 1940 |
| 2,230,725 | Nothan | Feb. 4, 1941 |
| 2,346,051 | Seamark | Apr. 4, 1944 |
| 2,456,203 | Loepsinger | Dec. 14, 1948 |
| 2,474,880 | Woodling | July 5, 1949 |
| 2,570,224 | Fason | Oct. 9, 1951 |